United States Patent Office 3,057,410
Patented Oct. 9, 1962

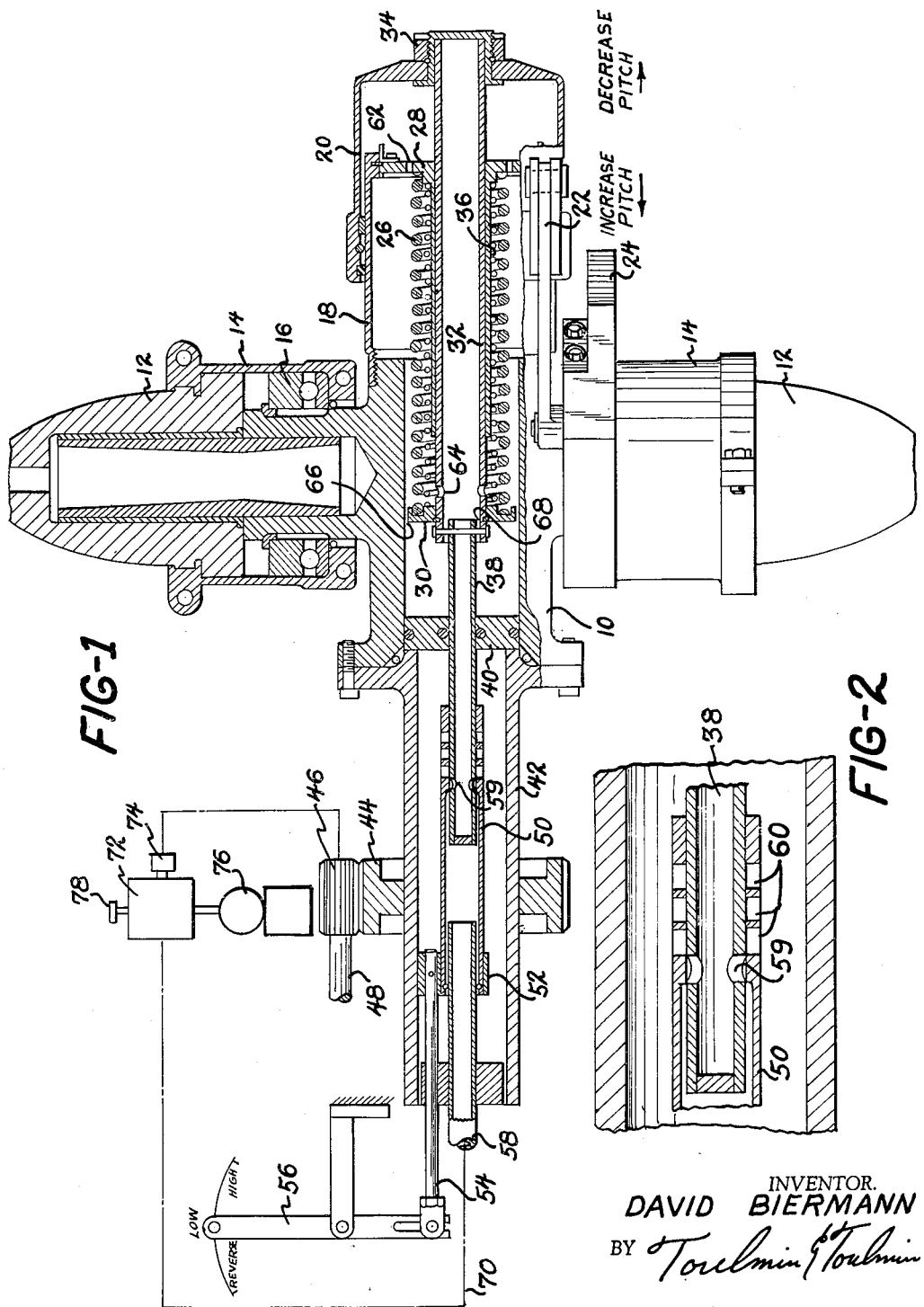

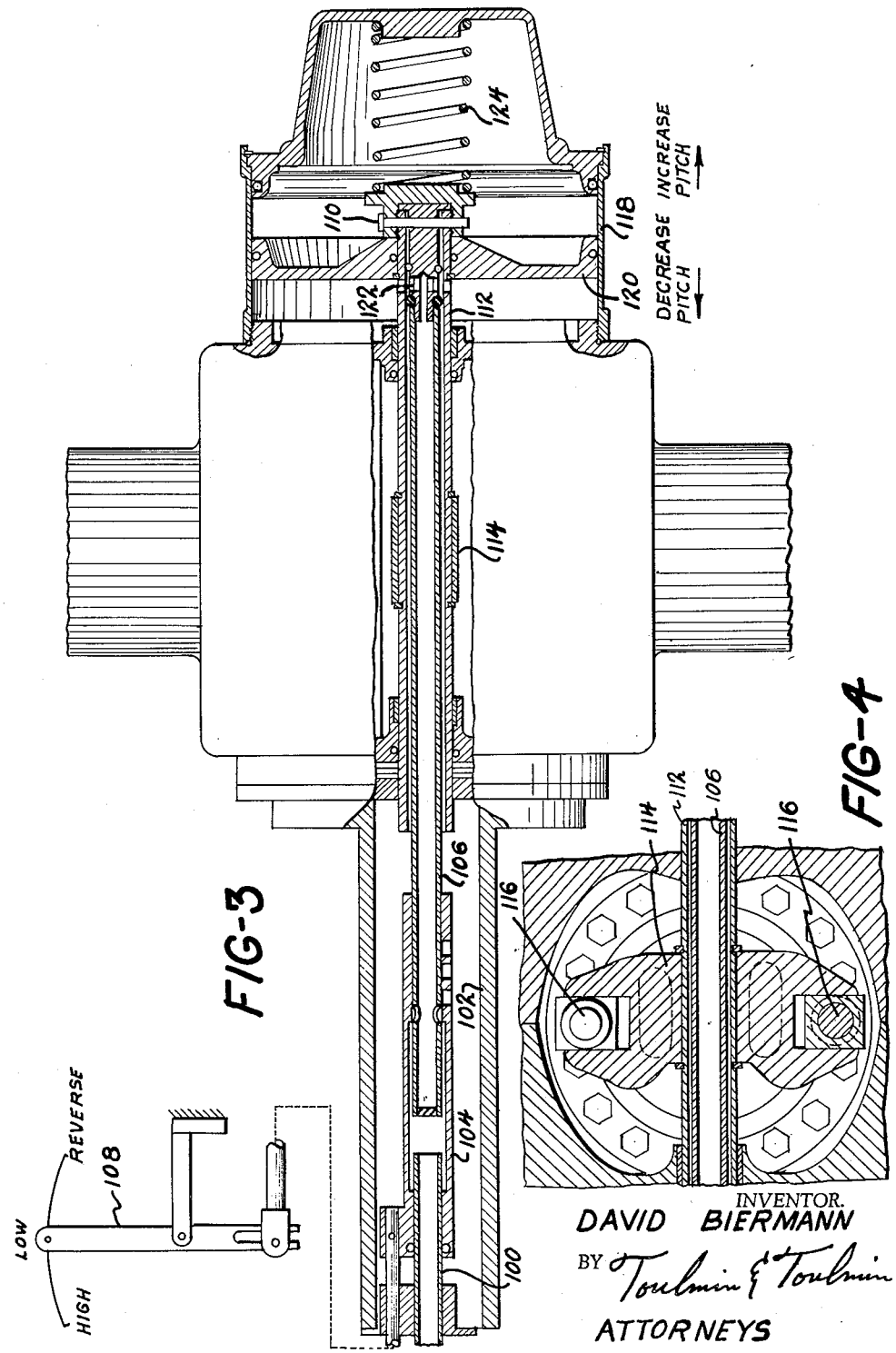

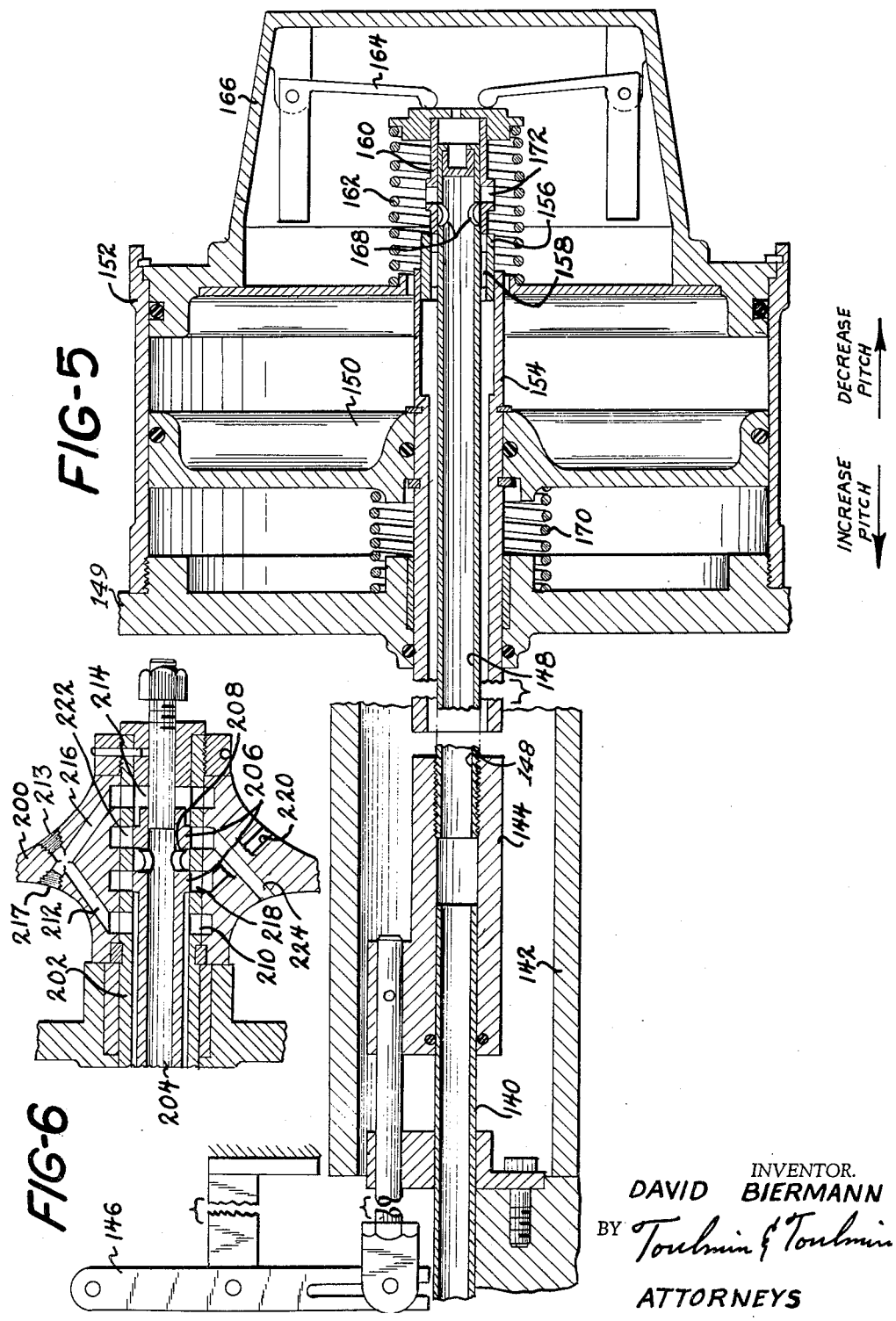

3,057,410
CONTROLLABLE PITCH PROPELLER
David Biermann, Piqua, Ohio, assignor to Hartzell Propeller, Inc., Piqua, Ohio
Filed May 2, 1958, Ser. No. 732,588
16 Claims. (Cl. 170—160.21)

This invention relates to airplane propellers and particularly to adjustable pitch airplane propellers and to a novel servomechanism associated therewith.

Variable pitch propellers are known and widely used and comprise, basically, a propeller hub, propeller blades extending from the hub and electrical, mechanical or fluid operated instrumentalities for adjusting the pitch of the propeller blades by rotating them about their longitudinal axes.

The particular propeller with which the present application is concerned is provided with an object in mind of adapting such a propeller to a hollow driving shaft.

Another object of this invention is the provision of a variable pitch propeller which is adapted for use with substantially any type of rotary propeller aircraft.

A particular object of this invention is the provision of an improved servomechanism for a variable pitch propeller which will be compact and inexpensive and extremely sensitive.

A still further object of this invention is the provision of a controllable pitch propeller including means for placing the propeller in reverse pitch position when this is desired for providing a braking effect on the aircraft.

A still further object of this invention is the provision of a controllable pitch propeller in which simple and basic pitch changing influences are utilized for varying the pitch of the propeller blades thereby resulting in a simple, reliable, controllable pitch propeller structure.

A still further object of this invention is the provision of a propeller in which the propeller is moved toward reduced pitch position by hydraulic pressure and toward increased pitch position by a substantially constant opposing force such as a spring.

It is also an object of this invention to utilize oil pressure developed by the rotation of the driving engine for urging the propeller toward decreased pitch position whereby interruption of the oil pressure, as by engine failure or breakage of oil lines or the like will release the propeller blades to the influence of the spring by which they are biased toward increased pitch position whereby the possibility exists of snapping the propeller into feathered position.

These and other objects and advantages will become more apparent upon reference to the drawings in which:

FIGURE 1 is a longitudinally sectional view through a preferred modification of the controllable pitch propeller including the invention of the present application;

FIGURE 2 is a fragmentary view drawn at enlarged scale showing the valve body and valve spindle and the ports therein that cooperate to control the supply of fluid to the pitch adjusting mechanism;

FIGURE 3 is a view like FIGURE 1 but showing a modified construction;

FIGURE 4 is a view showing the manner in which the blade adjusting yoke of FIGURE 3 is connected with the propeller blades;

FIGURE 5 is a sectional view similar to FIGURE 3 showing another arrangement of the valve mechanism; and FIGURE 6 is a sectional view showing the manner in which the servo valve can be incorporated directly within the piston for the supply of pressure to both sides of the piston.

Referring to the drawings somewhat more in detail, the preferred modification of FIGURE 1 consists of a hub 10 which carries a plurality of radially extending blades 12 which are attached to the hub by the clamps 14 and antifriction bearings 16.

The hub 10 has attached thereto on the outboard end a cylinder-piston arrangement consisting of stationary portion 18 and movable portion 20 sealed thereto. Movable portion 20 is connected with the clamps 14 of the propeller blades by the links 22 so that reciprocation of part 20 will cause simultaneous rotation of the propeller blades about their longitudinal axes for adjusting the pitch of the propeller.

Counterweights 24 mounted on the clamps 14 develop centrifugal force when the propeller is rotating tending to increase the propeller pitch, at least when the propeller is in cruising pitch range.

Springs 26 are also provided for urging the propeller toward increased pitch position and springs 26 bear at one end on a stationary plate 28 mounted in the outer end of part 18 of the cylinder piston arrangement. At the opposite end the spring means 26 bear against a collar 30 retained on the end of a tubular element 32 that is clamped in the outer end of part 20 of the cylinder-piston arrangement as by nut 34.

The tubular element 32 is surrounded by a tubular projection 36 formed on plate 28 thereby to provide a stop for the tubular element and part 20 connected therewith in one direction of movement.

At its end opposite part 20 tubular element 32 is pinned to a valve spindle 38 which extends through a sealing collar 40 into a drive tube 42 that has mounted thereon or integral therewith a gear 44 that is drivingly engaged by a pinion 46 mounted on the engine drive shaft 48.

The valve spindle extends reciprocably into a valve body 50 and which valve body is also hollow and is attached at its end opposite the valve spindle to a block 52 that is reciprocably mounted within drive tube 42 and connected by a shift rod 54 with a manually operable control mechanism that includes the lever 56.

The valve body 50 is also reciprocable over an oil pressure supply tube 58 that is supplied with oil pressure by a governor pump or from the driving engine oil system.

As will be seen in FIGURE 2 the valve spindle 38 is closed at the end that extends into the hollow valve body 50 and is provided with lateral ports 59. Valve spindle 38 in the region of ports 59 is slidably engaged by the hollow valve body 50 and body 50 is provided with a plurality of lateral ports 60. The arrangement is such that rightward movement of valve spindle 38 or leftward movement of the valve body, as observed in FIGURE 2, will connect ports 59 via ports 60 with the space inside drive tube 42 and which space is connected with exhaust.

On the other hand, leftward movement of the valve spindle or rightward movement of the valve body will connect ports 59 with the interior of the valve body 50 and which interior of the valve body is continuously supplied with fluid under pressure via pipe or tube 58. The space inside part 20 of the cylinder-piston means is communicated with the interior of the valve spindle as by port means 62, 64, space 66 around collar 30, and space 68 between the telescoping ends of valve spindle 38 and tubular element 32.

It accordingly follows that rightward movement of valve body 50, as it is viewed in FIGURES 1 and 2, will supply pressure to the inside of part 20 so that the part will follow the movement of the valve body thereby adjusting the pitch of the propeller blades towards zero, whereas, leftward movement of the valve body will be accomplished by leftward movement of the part 20 and an increase in pitch of the propeller blades.

The described servomechanism consisting of the rotating and reciprocating valve spindle 38, the non-rotating and reciprocating valve body 50, and the non-reciprocating tube or pipe 58, all sealingly and telescopically interfitted provides for a simple but highly effective servo valve device that can readily be adjusted manually or by a governor operated mechanism.

One manner in which the propeller structure and the servo valve device described can be utilized is illustrated in FIGURE 1 wherein tube or pipe 58 is supplied with fluid pressure via conduit 70 leading to governor element 74 which is driven by shaft 48. The governor element 74 discharges fluid to conduit 70 when the engine is underspeed and receives fluid back from conduit 70 when the engine is overspeed. There is no exchange of fluid when the motor is onspeed.

Manual means 78 may be provided for adjusting the onspeed revolution valve of governor 74.

During normal forward flight, the servo valve consisting of valve spindle 38 and valve body 50 acts as a low pitch stop and is held in fixed position thus preventing the supply of fluid from the governor controlled device from moving the propeller into reverse pitch position.

The operation of the propeller may be described in detail as follows:

Forward Operation

The manually operated control mechanism including lever 56 is set at low pitch position and wherein it remains during normal operation. Pressure fluid is supplied via conduit 70 to supply tube 58 whence the fluid flows into tubular valve body 50. From tubular valve body 50 the pressure fluid flows through ports 59 to tubular valve spindle 38 and the fluid therefrom flows into tube 32 and then through ports 68, 64, and 62 into the space between the movable portion 20 and stationary portion 18 of the cylinder-piston arrangement thereby moving the propeller into cruising pitch range. Should the propeller speed drop for any reason, the governor will call for reduced pitch, which will increase the pressure of the fluid supply thus moving the propeller blades toward reduced pitch position to allow the propeller speed to increase to its original value. The propeller pitch is reduced in this manner until the ports 59 are in the cut off position in which they are illustrated in FIGURES 1 and 2 and wherein free supply of fluid to the pitch adjusting mechanism is inhibited although there will continuously be some leakage through ports 59 either to or from the pitch adjusting mechanism thereby to prevent locking of the propeller blades in the cut off position.

It will be seen that the position of the valve body 50 definitely locates the low pitch stop position thereby preventing the governor operated mechanism from moving the blades into reverse pitch.

Reverse Pitch Operation

During reverse pitch operation the engine speed is reduced and the manually operated mechanism, including lever 56 is adjusted to reverse pitch position. The governor control mechanism is supplied oil under pressure and this oil passes through tube 58, the then open ports 59 and to valve spindle 30, and thence to the propeller blade adjusting mechanism which causes the blades to move into reverse pitch position. The limit of movement of the propeller blades at this time is limited by mechanical stop means, such as the tubular projection 36 or the position of the tubular valve body 50.

In returning from reverse pitch from forward pitch or to the low pitch stop position, the control lever 56 is moved from reverse pitch position toward low pitch or high pitch thus exposing ports 59 to the drain ports 60 which permits oil to drain from the pitch adjusting mechanism back to the engine. The springs and counterweights at this time provide energy for moving the blades back into forward pitch position.

The operation described above utilizes the governor controlled pressure but a constant oil pressure may be supplied and the position of the propeller blades be determined by the setting of valve body 50 as determined by adjustment of lever 56. When this type of operation occurs the pressure supplied is at all times sufficient to overcome the other influences acting on the propeller blades, namely, the springs and the counterweights or off-center mass of the blades themselves as well as aerodynamic action on the blades.

Servo valve operation of this nature is essential for vertical take-off type aircraft because the thrust of each propeller must be controlled accurately to obtain proper lateral control of the aircraft and this usually involves individual control of the propellers.

For control of the propeller blades solely by the position of the servo valve and where the propellers are always operated in the forward direction only, the springs may be eliminated and the counterweights only will be sufficient to produce the force necessary to urge the propeller blades toward increased pitch position at high propeller speeds.

In FIGURE 3 there is shown more or less diagrammatically another arrangement in which the telescoping servo valve arrangement of the present invention is utilized. The connection of the pitch adjusting piston with the blades, however, is somewhat different.

In FIGURE 3 there is an oil supply tube 100 projecting into the drive shaft 102 on the axis thereof and the oil supply tube is reciprocably sealed to valve body 104 that slidably receives valve spindle 106. A control lever 108 is connected with the valve body for axially adjusting the same, all in the previously described manner in connection with the first modification.

Valve spindle 106 is in the form of an elongated tube extending completely through the propeller hub and attached at its right end by pin 110 to an outer tubular element 112 that extends through the propeller hub and carries an adjusting yoke 114. Adjusting yoke 114 has its opposite ends slotted and receives crank pins 116 attached to the blades as diagrammatically illustrated in FIGURE 4 and as shown more in detail in my copending application Serial No. 640,629, filed February 18, 1957, now Patent No. 2,992,688.

The propeller hub carries a cylinder 118 and sealingly mounted therein is piston 120 attached to tubular member 112 so that reciprocation of the piston in the cylinder will reciprocate therewith tubular member 112 and yoke 114 thereby to adjust the pitch of the propeller blades. The fluid that enters valve spindle 106 passes through port means 122 in the said tube and in tubular member 112 into the space on the left side of piston 120 and whereby the piston can be urged by the pressure to increase the pitch of the propeller blades. Decreasing pitch of the propeller blades is accomplished by releasing fluid from the left side of piston 120. A constant bias may be exerted on piston 120 by centrifugal means or by a spring 124 located on the right side of the piston 120.

In the arrangement of FIGURES 3 and 4, the supply of pressure to the piston is operable to increase pitch as opposed to the arrangement of FIGURES 1 and 2 wherein the supply of pressure to the piston adjusting mechanism is operable for decreasing the pitch of the propeller. In both cases, however, the novel telescoping tubular valve arrangement is employed for controlling the supply of pressure fluid to the pitch adjusting mechanism as well as for determining the limits of movement of the propeller blades.

In the arrangement of FIGURE 5 there is employed a modification of the valve arrangement wherein there is an oil supply tube 140 extending into drive shaft 142 on the axis thereof and telescoping with a valve body element 144 connected for being adjusted by a manual lever 146. Shaft 142 is driven by a gear thereon (not shown) and lever 146 is pivoted on a stationary part of the engine. Valve body element 144 comprises a tube 148 extending through the propeller hub 149 which is fixed to drive shaft 142 the same as illustrated in FIGURES 1 and 3. Tube 148' extends completely through pitch adjusting piston 150 into the right end of cylinder 152 mounted on hub 149 in which the piston is reciprocable. The piston 150 is mounted on the pitch changing tube 154 that is connected with the propeller blades in the manner described in connection with FIGURES 3 and 4. The pitch adjusting tube 154 terminates in a cylindrical portion adapted for reciprocably receiving the sleeve like element 156 which is attached to tube 148 of the valve body as by the ribs 158.

A still further portion of the valve structure comprises a valve element 160 slidable on the outer end of tube portion 148 of valve body and urged rightwardly by a spring 162 and adapted for being urged leftwardly by the governor mechanism 164 consisting of weight control arms pivoted in the end member 166 of the cylinder 152.

When the propeller speed is low, spring 162 will move valve element 160 rightwardly a predetermined amount thus permitting fluid to flow from the right side of the piston 150 leftwardly through the sleeve 156 and thence through pitch adjusting tube 154 and out the left end thereof into the drain cavity inside drive shaft 142. This will permit rightward movement of the piston 152 under the influence of spring 170 or other forces acting on the propeller blades thereby to decrease the propeller pitch to permit it to speed up. As the propeller speeds up the governor mechanism 164 will overcome spring 162 and move valve element 160 leftwardly to cut off ports 168 thus to stop the changing of the pitch of the propeller. Should the propeller speed increase further, the governor mechanism will shift valve element 160 further leftwardly and after a predetermined amount of movement pressure fluid will pass through ports 168 and ports 172 in the valve sleeve into the cylinder to the right side of piston 150 thus thrusting the piston leftwardly thus increasing the pitch of the propeller the proper amount to reduce the speed to maintain the r.p.m. of the propeller constant.

It will be perceived that the servo valve arrangement of FIGURE 5 is substantially identical with that of the previously described modification.

In FIGURE 6 there is shown an arrangement whereby the tubular servo valve structure can be utilized for controlling the supply of pressure to both sides of the piston.

In FIGURE 6 the pitch adjusting piston 200 is mounted on the pitch adjusting tube 202 that is connected with the propeller blades, as disclosed in the FIGURE 3 modification. The pitch adjusting tube reciprocably receives the reciprocable tubular valve element 204 which has pressure fluid supplied to the interior thereof. The space between tube 202 and valve element 204 is connected with drain.

Reciprocable element 204 has spaced annular portions 206 and positioned therebetween is pressure port 208. The tube 202 is provided with ports 210 registering with a groove that is connected with a bore 212 in the piston leading toward the right side of piston 200 and plugged by plug 213. Tube element 202 also has ports 214 registering with a similar groove at the opposite end connected with bore 216 leading toward the left side of piston 200 and plugged by plug 217. Bores 212 and 216 are interconnected whereby ports 210 and 214 are always connected to drain.

Adjacent ports 210 in pitch changing tube 202 is another set of ports 218 communicating with a groove connected by bore 220 with the right side of piston 200, and adjacent ports 214 is still another set of ports 222 in pitch changing tube 202 connected by bore 224 with the left side of piston 200.

It will be evident that movement of tube valve element 204 in either direction within piston changing tube 202 will be accompanied by a supply of pressure fluid to one side of piston 202 with simultaneous exhausting of the other side thereof whereby the piston is always caused to follow movements of the tubular valve element. In this manner the pitch of the propeller blades is controlled in the absence of any other forces acting thereon other than the fluid pressure supplied to the opposite sides of the piston.

It will be understood that this invention is susceptible to modification in order to adapt it to different usages and conditions; and, accordingly, it is desired to comprehend such modifications within this invention as may fall within the scope of the appended claims.

I claim:

1. In a variable pitch propeller; a hub, propeller blades rotatably mounted in the hub, speed responsive means acting on the blades urging them in one direction to change the pitch of the propeller and hydraulic means acting on the blades to change the pitch of the propeller in the other direction, and valve means for controlling the supply of fluid to said hydraulic means comprising a first valve part in the hub on the axis thereof, a second valve part also on the axis of the hub telescoping the first part, one of said parts being axially movable relative to the hub in response to pitch changes and the other valve part being adjustable axially relative to the hub along the axis of the hub, said valve parts comprising ports adapted for selective registration for supplying pressure fluid to said hydraulic means or for exhausting fluid therefrom or for substantially sealing off said hydraulic means.

2. In a variable pitch propeller; a hub, propeller blades rotatably mounted in the hub, speed responsive means acting on the blades urging them in one direction to change the pitch of the propeller and hydraulic means acting on the blades to change the pitch of the propeller in the other direction, and valve means for controlling the supply of fluid to said hydraulic means comprising a valve body in the hub on the axis thereof axially adjustable relative to the hub and having axially spaced pressure and exhaust ports, said valve means also comprising a valve spindle telescoping said valve body and having a port leading to said hydraulic means, the port in the valve spindle being adapted for being disposed between the ports in the valve body or in registration with either thereof, said valve spindle being axially connected to said means acting on the blades and being movable axially in the hub in response to pitch changes of the propeller.

3. In a variable pitch propeller; a hub; propeller blades rotatably mounted in the hub, speed responsive means acting on the blades urging them in one direction to change the pitch of the propeller and hydraulic means acting on the blades to change the pitch of the propeller in the other direction, and valve means for controlling the supply of fluid to said hydraulic means comprising a valve body in the hub on the axis thereof axially adjustable relative to the hub and having axially spaced pressure and exhaust ports, said valve means also comprising a valve spindle telescoping said valve body and having a port leading to said hydraulic means, the port in the valve spindle being adapted for being disposed between the ports in the valve body or in registration with either thereof, said valve spindle being connected with said means acting on the blades for movement axially of the propeller hub in unison with said blades whereby the valve spindle and valve body form a follow-up servo mechanism.

4. In an infinitely variable pitch propeller; a hub, propeller blades rotatably mounted in the hub, centrifugal responsive means acting on the blades tending to change the pitch thereof in one direction during rotation of the propeller, hydraulic means carried by the hub connected with the blades responsive to fluid pressure for changing the pitch of the blades in the other direction and valve means for controlling the supply of fluid to said hydraulic means, said valve means comprising a tubular valve body located on the axis of the hub and adjustable relative to said hub along the said axis and having axially spaced pressure and exhaust ports, a tubular valve spindle telescoping said valve body and interconnected with the blades so as to move axially of the propeller hub as the blades change pitch, said valve spindle having a port therein adapted for being disposed between the pressure and exhaust ports of the valve body so as to be substantially sealed off therefrom or for registering with one or the other of said pressure and exhaust ports as the spindle and valve body move relatively, and means for supplying fluid under pressure to the pressure port of said valve body.

5. In an infinitely variable pitch propeller; a hub, propeller blades rotatably mounted in the hub, centrifugal responsive means acting on the blades tending to change the pitch thereof in one direction during rotation of the propeller, hydraulic means carried by the hub connected with the blades responsive to fluid pressure for changing the pitch of the blades in the other direction and valve means for controlling the supply of fluid to said hydraulic means, said valve means comprising a tubular valve body located on the axis of the hub and adjustable relative to the hub along the said axis and having axially spaced pressure and exhaust ports, a tubular valve spindle telescoping said valve body and interconnected with the blades so as to move axially of the propeller hub as the blades change pitch, said valve spindle having a port therein adapted for being disposed between the pressure and exhaust ports of the valve body so as to be substantially sealed off therefrom or for registering with one or the other of said pressure and exhaust ports as the spindle and valve body move relatively, and means for supplying pressure to the pressure port of said valve body.

6. In an infinitely variable pitch propeller; a hub, propeller blades supported by the hub and rotatable on the hub for changing the pitch of the propeller, centrifugal responsive means acting on the propeller blades tending to change the pitch thereof in one direction during rotation of the propeller, a fluid motor carried by the hub including a movable part connected with the propeller blades responsive to fluid pressure for changing the pitch of the propeller in the opposite direction, a valve mounted on the axis of the hub of the propeller for controlling the supply of fluid to said hydraulic motor comprising a tubular valve spindle connected with the said part of the hydraulic motor so as to move therewith, said spindle having its end adjacent the hydraulic motor hydraulically connected therewith and its other end closed, a lateral port in the spindle adjacent the said other end thereof, a tubular valve body fitting around the spindle having axially spaced pressure and exhaust ports, the said port in the valve spindle being adapted for registering with either the pressure or exhaust ports or for being disposed therebetween and substantially sealed off by the valve body, means for supplying pressure to the pressure port of the valve body, and means located outside the hub for adjusting the valve body axially thereof.

7. In an infinitely variable pitch propeller having a hub with propeller blades rotatably carried by the hub; centrifugal responsive means acting on the blades for urging them in one direction to change the pitch of the propeller during rotation of the propeller, and hydraulic means carried by the hub connected with the blades and responsive to fluid pressure for urging the blades in the opposite direction to change the pitch of the propeller, and valve means for supplying fluid to said hydraulic means, said valve means being mounted on the axis of the hub and comprising one part reciprocable and rotatable on the said axis and interconnected with said blades for axial movement in response to pitch changing influences, a second part telescoping said first part reciprocable on the axis of the hub but non-rotatable, means external of the hub and extending therein connected with said second part for movement thereof axially of the hub relative to the said first part, and means for supplying pressure fluid under pressure to said valve means.

8. In a controllable pitch propeller, a drive shaft, a hub attached to the drive shaft, propeller blades rotatably carried by said hub, a cylinder on the hub coaxial with the hub and drive shaft, a piston on the cylinder and means connecting the piston with the blades for rotation of the blades in response to axial movement of the piston, means including counterweights associated with the blades operable to urge the blades in one direction to change the pitch of the propeller, a tubular valve spindle on the axis of the hub and therein and connected with the piston for movement therewith, a lateral port in the spindle adjacent the end opposite the piston, a valve body slidably fitting over the valve spindle, a valve port in the valve body adapted for registration with the port in the spindle to drain fluid from the spindle and, therefore, from said piston, a pressure port in the valve body spaced from the exhaust port adapted for registration with the port in the spindle to admit pressure to the valve spindle and the piston, the said port in the spindle being substantially sealed off from the ports in the valve body when disposed therebetween, but unsealed relative to either port in the valve body upon any relative movement of valve body and valve spindle, and means external of the hub for manually positioning said valve body thereby to change the position at which the port in the spindle is closed off from the ports in the valve body.

9. In a controllable pitch propeller, a hub, blades rotatably carried by the hub, a cylinder on the hub on the axis of rotation thereof, a piston on the cylinder, links connecting the piston with the blades for rotation of the blades when the piston moves, counterweights carried by the blades operable to develop centrifugal force as the propeller rotates tending to increase the pitch of the propeller, a tubular valve spindle on the axis of the hub and therein attached to the piston so as to move therewith, the end of the spindle opposite the piston being closed and the other end of the spindle being hydraulically connected with the piston, a lateral port in the spindle adjacent its closed end, a tubular valve body slidably fitted around the spindle and having a land area adapted for registration with the port in the spindle thereby to substantially close off the port, the interior of the valve body on one side of the land area being connected with exhaust and on the other side of the land area being connected to a supply of pressure fluid, and manual means positioned outside the hub attached to the valve body for changing the axial position of the valve body.

10. In a controllable pitch propeller, a hub, blades rotatably carried by the hub, a cylinder on the hub on the axis of rotation thereof, a piston on the cylinder, links connecting the piston with the blades for rotation of the blades when the piston moves, counterweights carried by the blades operable to develop centrifugal force as the propeller rotates tending to increase the pitch of the propeller, a tubular valve spindle on the axis of the hub and therein attached to the piston so as to move therewith, the end of the spindle opposite the piston being closed and the other end of the spindle being hydraulically connected with the piston, a lateral port in the spindle adjacent its closed end, a tubular valve body slidably fitted around the spindle and having a land area adapted for registration with the port in the spindle thereby to substantially close off the port, the interior of the valve body on one side of the land area being connected with exhaust and on the other side of the land area being connected to a supply of pressure fluid, and manual means positioned outside the hub attached to the valve body for changing the axial position of the valve body, there being means for supplying the said pressure fluid to the valve body comprising a tube extending axially therein and slidably sealed to the valve body so that the tube can rotate in the valve body while the valve body can reciprocate relative to the tube.

11. In a variable pitch propeller, a hub, blades rotatably carried by the hub, hydraulic means also carried by the hub having a movable element connected with the blades for changing the pitch thereof in one direction when said element moves, centrifugally responsive weights tending to change the pitch in the opposite direction, and a servo valve mounted within the hub on the axis thereof having a first part connected with said element for axial movement therewith and for rotation therewith, a second part slidably engaging said first part and having means for the axial adjustment thereof from outside the hub during operation of the propeller, and cooperating ports in said valve parts for supplying fluid to said hydraulic means in one relative position of the parts, for exhausting fluid from said hydraulic means in another relative position of said parts, and for sealing fluid in said hydraulic means in a third relative position of said parts located between and immediately adjacent to said first and second positions.

12. A variable pitch propeller as described in claim 8, which includes means for manually preselecting the position of said valve body thereby preselecting the pitch of the propeller.

13. In a controllable pitch propeller, a drive shaft, a hub attached to the drive shaft, propeller blades rotatably carried by said hub, a cylinder on the hub coaxial with the hub and drive shaft, a piston associated with the cylinder, means connecting the piston with the blades for rotation of the blades in response to the axial movement of the piston including tubular piston rod, governor means responsive to rotational speed mounted coaxially within said cylinder, said governor means comprising; a first sleeve closed at one end and mounted coaxially with said drive shaft, means for supplying hydraulic fluid to said first sleeve, said first sleeve being manually movable in the axial direction and having radial valve ports located near the closed end, a second sleeve slidably movable on said first sleeve and having two sets of ports one set cooperating with the ports in first said sleeve to allow fluid from said first sleeve to enter said cylinder when said second sleeve is moved in one direction relative to the first sleeve and the second set of ports cooperating with said first said sleeve to allow fluid to escape from said cylinder to drain back through said tubular piston rod when said second sleeve is moved relative to said first sleeve in the opposite direction, a spring urging said second sleeve in one direction, and centrifugally responsive flyball means mounted on said cylinder operable in response to rotation of said propeller for urging said second sleeve in the opposite direction.

14. In a variable pitch propeller; a hub, propeller blades rotatably mounted in the hub, centrifugal responsive means acting on the blades for urging them in one direction to change the pitch of the propeller and hydraulic means to change the pitch in the other direction, valve means for controlling the supply of fluid to and from said hydraulic means comprising a first valve part in the hub on the axis thereof being manually adjustable axially relative to the hub, a second valve part also on the axis of the hub telescoping the first part, a speed regulator engaging said second valve part for axial movement thereof in response to changes in rotational speed, said valve parts comprising ports adapted for selective registration for supplying pressure fluid to said hydraulic means or for exhausting fluid therefrom or for substantially sealing off said hydraulic means.

15. A variable pitch propeller according to claim 5 in which resilient means is provided acting on said blades in a direction to augment said centrifugal responsive means.

16. A variable pitch propeller according to claim 6 in which resilient means is provided acting on said blades in a direction to augment said centrifugal responsive means.

References Cited in the file of this patent

UNITED STATES PATENTS

| Re. 20,283 | Caldwell | Mar. 9, 1937 |
| 1,510,436 | Englesson | Sept. 30, 1924 |
| 2,233,468 | Barthel | Mar. 4, 1941 |
| 2,308,228 | Matteucci | Jan. 12, 1943 |
| 2,347,104 | Hoover | Apr. 18, 1944 |
| 2,368,950 | Thomas | Feb. 6, 1945 |
| 2,578,350 | Greene | Dec. 11, 1951 |
| 2,686,569 | Bruce | Aug. 17, 1954 |

FOREIGN PATENTS

| 1,001,389 | France | Oct. 24, 1951 |
| 999,092 | France | July 16, 1952 |